US012739769B2

(12) United States Patent
Li et al.

(10) Patent No.: US 12,739,769 B2
(45) Date of Patent: Sep. 15, 2026

(54) INFORMATION INDICATION METHOD AND APPARATUS

(71) Applicant: HUAWEI TECHNOLOGIES CO., LTD., Shenzhen (CN)

(72) Inventors: Jiaojiao Li, Beijing (CN); Junren Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 493 days.

(21) Appl. No.: 18/079,296

(22) Filed: Dec. 12, 2022

(65) Prior Publication Data

US 2023/0110787 A1 Apr. 13, 2023

Related U.S. Application Data

(63) Continuation of application No. PCT/CN2021/099771, filed on Jun. 11, 2021.

(30) Foreign Application Priority Data

Jun. 15, 2020 (CN) ......................... 202010543960.8

(51) Int. Cl.
*H04W 56/00* (2009.01)
*H04W 72/0446* (2023.01)
*H04W 72/0453* (2023.01)

(52) U.S. Cl.
CPC ..... *H04W 56/006* (2013.01); *H04W 72/0446* (2013.01); *H04W 72/0453* (2013.01)

(58) Field of Classification Search
CPC ........... H04W 56/006; H04W 72/0446; H04W 72/0453; H04W 48/16; H04W 48/10; Y02D 30/70
See application file for complete search history.

(56) References Cited

U.S. PATENT DOCUMENTS

| | | | | |
|---|---|---|---|---|
| 2005/0265286 | A1* | 12/2005 | Umemura ............. | H04W 76/11 455/436 |
| 2011/0312328 | A1* | 12/2011 | Choi .................. | H04W 72/541 455/450 |
| 2019/0037481 | A1 | 1/2019 | Zhang et al. | |
| 2019/0037491 | A1 | 1/2019 | Sun et al. | |

(Continued)

FOREIGN PATENT DOCUMENTS

| | | |
|---|---|---|
| CN | 108235435 A | 6/2018 |
| CN | 110226354 A | 9/2019 |

(Continued)

OTHER PUBLICATIONS

R1-1903925, Huawei et al, Initial access signal and channels in NR unlicensed band, 3GPP TSG RAN WG1 Meeting #96bis, Xi'an, China, Apr. 8-12, 2019, 17 pages.

(Continued)

*Primary Examiner* — Christine Ng

(74) *Attorney, Agent, or Firm* — HAUPTMAN HAM, LLP

(57) ABSTRACT

An information indication method includes receiving a first message including first information. The first information indicates location information of a first synchronization signal and physical broadcast channel block (SSB) which is usable for reduced capability (REDCAP) user equipment. The method also includes determining the first SSB based on the first information.

16 Claims, 5 Drawing Sheets

(56) References Cited

U.S. PATENT DOCUMENTS

| | | | | |
|---|---|---|---|---|
| 2020/0068514 | A1* | 2/2020 | Liu | H04W 56/001 |
| 2020/0092799 | A1 | 3/2020 | Xu et al. | |
| 2020/0154341 | A1* | 5/2020 | Sun | H04W 48/12 |
| 2020/0205102 | A1* | 6/2020 | Islam | H04W 72/0446 |
| 2020/0404601 | A1* | 12/2020 | Lin | H04L 1/0072 |
| 2021/0321348 | A1* | 10/2021 | Ohara | H04L 5/14 |
| 2021/0329574 | A1* | 10/2021 | Ang | H04L 5/0037 |
| 2021/0337487 | A1* | 10/2021 | Park | H04W 72/30 |
| 2021/0360619 | A1* | 11/2021 | Liu | H04W 72/0453 |
| 2021/0367820 | A1* | 11/2021 | Cha | H04L 27/2621 |
| 2021/0385773 | A1* | 12/2021 | Ma | H04B 7/1851 |
| 2021/0410186 | A1* | 12/2021 | Hajir | H04W 74/006 |
| 2022/0174620 | A1* | 6/2022 | Cha | H04W 56/006 |
| 2022/0338140 | A1* | 10/2022 | Zhang | H04L 5/0092 |
| 2024/0049287 | A1* | 2/2024 | Lee | H04W 74/004 |

FOREIGN PATENT DOCUMENTS

| | | | |
|---|---|---|---|
| CN | 110278599 | A | 9/2019 |
| CN | 110463258 | A | 11/2019 |
| CN | 110475319 | A | 11/2019 |
| CN | 110572865 | A | 12/2019 |
| CN | 110720248 | A | 1/2020 |
| CN | 110831126 | A | 2/2020 |
| CN | 111132184 | A | 5/2020 |
| CN | 111132336 | A | 5/2020 |
| KR | 20190103891 | A | 9/2019 |
| WO | 2017123279 | A1 | 7/2017 |
| WO | 2019157769 | A1 | 8/2019 |
| WO | 2021002725 | A1 | 1/2021 |
| WO | 2021162829 | A1 | 8/2021 |
| WO | 2021190510 | A1 | 9/2021 |

OTHER PUBLICATIONS

3GPP TS 38.331 V16.0.0 (Mar. 2020), 3rd Generation Partnership Project; Technical Specification Group Radio Access Network; NR; Radio Resource Control (RRC) protocol specification (Release 16), 835 pages, XP051893854.

3GPP TS 38.101-1 V15.10.0 (Jun. 2020), 3rd Generation Partnership Project; Technical Specification Group Radio Access Network; NR;User Equipment (UE) radio transmission and reception;Part 1: Range 1 Standalone(Release 15), 239 pages.

R3-186489, Huawei, (TP for BL CR for TS 38.423): SSB type indication over Xn, 3GPP TSG-RAN3 Meeting #102, Spokane, US, Nov. 12-16, 2018, 3 pages.

R1-2003969, CMCC, Discussion on framework of reduced capability NR devices, 3GPP TSG RAN WG1 #101, e-Meeting, May 25-Jun. 5, 2020, 4 pages, XP052345350.

3GPP TS 38.101-2 V16.3.1 (Mar. 2020), 3rd Generation Partnership Project; Technical Specification Group Radio Access Network; NR;User Equipment (UE) radio transmission and reception;Part 2: Range 2 Standalone(Release 16), 170 pages.

RP-181723, Kazuaki Takeda, Status Report to TSG, 3GPP TSG RAN meeting #81, Gold Coast, Australia, Sep. 10-13, 2018, 34 pages.

R1-2004421, NTT Docomo, Inc., Potential UE complexity reduction features for RedCap, 3GPP TSG RAN WG1 #101, e-Meeting, May 25-Jun. 5, 2020, 5 pages, XP052345800.

International Search Report issued in corresponding International Application No. PCT/CN2021/099771, dated Aug. 27, 2021, pp. 1-9.

Extended European Search Report issued in corresponding European Application No. 21825502.4, dated Oct. 26, 2023, pp. 1-11.

Chinese Office Action issued in corresponding Chinese Application No. 202010543960.8, dated Apr. 2, 2022, pp. 1-10.

Chinese Notice of Allowance issued in corresponding Chinese Application No. 202010543960.8, dated Aug. 15, 2022, pp. 1-6.

European Office Action issued in corresponding European Application No. 21825502.4, dated Jun. 6, 2025, pp. 1-8.

* cited by examiner

INFORMATION INDICATION METHOD AND APPARATUS

CROSS-REFERENCE TO RELATED APPLICATIONS

This application is a continuation of International Application No. PCT/CN2021/099771, filed on Jun. 11, 2021, which claims priority to Chinese Patent Application No. 202010543960.8, filed on Jun. 15, 2020. The disclosures of the aforementioned applications are hereby incorporated by reference in their entireties.

TECHNICAL FIELD

This application relates to the field of communication technologies, and in particular, to an information indication method and apparatus.

BACKGROUND

With continuous development of communication technologies, a wireless communication system evolves from a first-generation analog communication system to a new radio (New Radio, NR) system. In the NR system, a terminal device of a user may receive, in an initial access process, a physical downlink shared channel (Physical Downlink Shared Channel, PDSCH) broadcast by a network device, and the PDSCH carries system information, for example, a system information block (System Information Block, SIB) 1. The terminal device decodes the SIB 1, and may obtain bandwidth information of a terminal allowed to access a cell, for example, configuration information of an initial (initial) bandwidth part (Bandwidth Part, BWP). When a maximum bandwidth supported by the terminal device is greater than or equal to an initial BWP bandwidth of the cell, and the maximum bandwidth supported by the terminal device is less than or equal to a carrier bandwidth, a camping condition of the cell is met. In this case, the terminal device may perform an initial random access process on the initial BWP of the cell. If the camping condition of the cell is not met, the terminal device continues to scan another SSB until an SSB that meets an access condition is obtained.

However, due to different requirements of a user, more reduced capability (Reduced Capability, REDCAP) UEs are increasingly applied. The REDCAP UE refers to a low-complexity device, for example, an industrial wireless sensor device, a video surveillance device, and a wearable device. The foregoing REDCAP UE and a conventional terminal device in a bandwidth-limited state may be collectively referred to as a narrowband terminal. The narrowband terminal has a reduced or limited terminal capability, and supports a narrow maximum bandwidth. For example, a maximum bandwidth supported by the narrowband terminal may be 5 M, 10 M, or 20 M.

Therefore, if the narrowband terminal obtains the initial BWP of the cell by performing the foregoing steps, and a bandwidth configuration of the initial BWP of the cell is narrow (for example, 10 M), the narrowband terminal is more likely to meet the foregoing bandwidth condition, however, the bandwidth condition of the initial BWP is excessively limited for the conventional terminal device. If the bandwidth of the initial BWP of the cell is set to a wide value (for example, 25 M), the narrowband terminal does not meet the foregoing bandwidth condition. In this case, the narrowband terminal denotes the cell and intra-frequency cells of the cell as barred (barred), and continues to search until a cell that meets the camping condition is found. Therefore, the initial access process of the narrowband terminal is slow.

SUMMARY

This application provides an information indication method and apparatus, to resolve a conventional-technology problem that a process of initially accessing a network by a narrowband terminal is slow. The problem can be resolved by configuring indication information, to reduce a quantity of times that the narrowband terminal blindly scans SSBs, and accelerate an initial access process of the narrowband terminal.

To achieve the foregoing objective, this application uses the following technical solutions.

According to a first aspect, an information indication method is provided. The method includes: receiving a first message, where the first message includes first information, and the first information indicates location information of a first synchronization signal and physical broadcast channel block SSB; and determining the first SSB based on the first information.

In the foregoing technical solution, in a process of performing initial access by a terminal device, especially a narrowband terminal, the terminal device may obtain, based on the first information configured in the first message, location information of a time domain and/or frequency domain resource of the first SSB indicated by the first information, to directionally perform a subsequent initial access process based on a location of the resource, for example, switch to a time-frequency resource required by the narrowband terminal to establish a connection, or avoid switching to a time-frequency resource that is not suitable for the narrowband terminal to establish a connection. Therefore, a quantity of times that the narrowband terminal blindly scans SSBs can be reduced, an initial access process of the narrowband terminal can be accelerated, and power consumption can be reduced.

In a possible design, the location information of the first SSB includes time-frequency resource allocation information or frequency information of at least one first SSB.

In the foregoing possible implementation, the time-frequency resource allocation information or the frequency information of the at least one SSB may be configured in the first information, to indicate location information of an SSB for which a narrowband initial BWP is configured or location information of an SSB for which no narrowband initial BWP is configured. In this way, the terminal device can switch, based on an indication of the first information, to an appropriate SSB to attempt initial access. Therefore, an initial access process of the narrowband terminal is accelerated.

In a possible design, the first information may further indicate a control resource set (Control Resource Set, CORESET), and the first information includes time-frequency resource allocation information of at least one CORESET.

In a possible design, the time-frequency resource allocation information includes a time domain and/or frequency domain offset between the first SSB and a second SSB, and the second SSB is an SSB corresponding to the first message.

In the foregoing possible implementation, the terminal device may obtain, based on the time domain and/or frequency domain offset between the first SSB and a current second SSB corresponding to the first message configured by a network device, a first SSB for which a narrowband initial BWP is configured or a first SSB for which a narrowband initial BWP is not configured, to directionally perform initial access. This improves initial access flexibility and access efficiency of the terminal device.

In a possible design, the frequency information includes at least one global synchronization channel number GSCN offset, the at least one GSCN offset is a difference between a first GSCN corresponding to the at least one first SSB and a second GSCN, and the second GSCN is a GSCN corresponding to the first message.

In the foregoing possible implementation, the first information configured by the network device may indicate based on a GSCN offset between a GSCN corresponding to a current SSB and a GSCN of the first SSB. In this way, the terminal device can obtain frequency information of the first SSB based on the GSCN offset, and attempt initial access on the frequency. Therefore, a quantity of times of blindly scanning SSBs is reduced, and an initial access process of the terminal device is accelerated.

In a possible design, the frequency information includes at least one global synchronization channel number GSCN offset, and the at least one GSCN offset is used to determine, based on a second GSCN, a GSCN range corresponding to the at least one first SSB, or the at least one GSCN offset is used to determine, based on a second GSCN, that a GSCN range corresponding to the first SSB is not included, and the second GSCN is a GSCN corresponding to the first message.

In the foregoing possible implementation, the first information that is configured by the network device and that is received by the terminal device may be a GSCN offset between a GSCN corresponding to a current SSB and a GSCN corresponding to the at least one first SSB. In this way, the terminal device can obtain, based on the GSCN offset, a GSCN range of an SSB for which a narrowband BWP is configured or not configured, and attempt or skip initial access in the frequency range. Therefore, a quantity of times of blindly scanning SSBs is reduced, and an initial access process of the terminal device is accelerated.

In a possible design, the first message is a system information block SIB. In the foregoing possible implementation, in a process of attempting initial access by the terminal device, the terminal device may obtain the location information of the first SSB based on an SIB message sent by the network device, for example, an SIB 1. In this way, the terminal device directionally switches to a next SSB based on the first information to attempt initial access. This reduces a quantity of times of blindly scanning SSBs by the terminal device, and improves efficiency and flexibility of initial access.

According to a second aspect, an information indication method is provided. The method includes: receiving a second message, where the second message includes second information, and the second information indicates a bandwidth range of an initial bandwidth part BWP; and performing initial access based on the second message.

In the foregoing technical solution, a terminal device may receive the second information configured by a network device, and determine a bandwidth range of the initial bandwidth part BWP based on the second information, to determine whether a camping condition of a cell is met. In this way, the terminal device directionally performs a subsequent initial access process. This accelerates an initial access process of a narrowband terminal.

In a possible design, the second information indicates a bandwidth range of an initial BWP corresponding to the second message, or a bandwidth range of an initial BWP corresponding to an SSB indicated in the second message.

In the foregoing possible implementation, the second information may indicate a bandwidth range of an initial BWP of a current SSB, or the second information may indicate a bandwidth range of an initial BWP of another SSB. In this way, the terminal device can determine, based on an indication of the second information, whether a camping condition of the cell is met, and the terminal device attempts to perform an initial access process on an SSB indicating a BWP bandwidth range, or skips the SSB to perform initial access. Therefore, efficiency and flexibility of initial access are improved.

In a possible design, the second information indicates that a bandwidth of the initial BWP is greater than or equal to a first threshold, and/or that the bandwidth of the initial BWP is less than or equal to a second threshold.

In the foregoing possible implementation, the second information may indicate that an initial BWP bandwidth range of a current SSB or a next SSB may fall within an interval range determined based on the first threshold and/or the second threshold. In this way, the terminal device may determine, based on the initial BWP bandwidth range indicated by the second information, whether a camping condition of the cell is met, and the terminal device attempts to perform an initial access process on an SSB indicating a BWP bandwidth range or skips the SSB to perform initial access. Therefore, efficiency and flexibility of initial access are improved.

In a possible design, the second information is carried on a physical broadcast channel PBCH or a master information block MIB on the PBCH.

In the foregoing possible implementation, the network device may configure the second information on the PBCH or the MIB in an initial access process. In this way, the terminal device can determine in advance, based on an indication of the second information, to perform a subsequent initial access process.

According to a third aspect, an information indication method is provided. The method includes: determining first information based on a first SSB, where the first information indicates location information of the first SSB; and sending a first message, where the first message includes the first information.

In a possible design, the location information of the first SSB includes time-frequency resource allocation information or frequency information of at least one SSB.

In a possible design, the time-frequency resource allocation information includes a time domain and/or frequency domain offset between the first SSB and a second SSB, and the second SSB is an SSB corresponding to the first message.

In a possible design, the frequency information includes at least one first global synchronization channel number GSCN offset, the at least one GSCN offset is a difference between a GSCN corresponding to the at least one first SSB and a second GSCN, and the second GSCN is a GSCN corresponding to the first message.

In a possible design, the frequency information includes at least one global synchronization channel number GSCN offset, and the at least one GSCN offset is used to determine, based on a second GSCN, a GSCN range corresponding to the at least one first SSB, or the at least one GSCN offset is used to determine, based on a second GSCN, that a GSCN range corresponding to the first SSB is not included, and the second GSCN is a GSCN corresponding to the first message.

In a possible design, the first message is a system information block SIB.

According to a fourth aspect, an information indication method is provided. The method includes: determining second information, where the second information indicates a bandwidth range of an initial bandwidth part BWP; and sending a second message, where the second message includes the second information.

In a possible design, the second information indicates a bandwidth range of an initial BWP corresponding to the second message, or a bandwidth range of an initial BWP corresponding to an SSB indicated in the second message.

In a possible design, the second information indicates that a bandwidth of the initial BWP is greater than or equal to a first threshold, and/or that the bandwidth of the initial BWP is less than or equal to a second threshold.

In a possible design, the second information is carried on a physical broadcast channel PBCH or a master information block MIB on the PBCH.

According to a fifth aspect, an information indication method is provided, applied to a terminal device. The method includes: receiving third information, where the third information indicates whether a currently received SIB message is consistent with a previously received SIB message, or the third information indicates whether a currently received SIB message is consistent with a next to-be-received SIB message; and the terminal device combines SIB messages based on the third information.

In the foregoing technical solution, the terminal device may determine, based on the received third information, whether the currently received SIB message is consistent with the previously received SIB message, or determine whether the currently received SIB message is consistent with the next to-be-received SIB message. If the SIB messages are consistent, the terminal device continues to combine the currently received SIB message and the next to-be-received SIB message. If it is determined that the SIB messages are inconsistent, the terminal device should stop combining, to avoid an error and a resource waste that are caused by combining different SIB messages.

In a possible design, the third information may be carried in downlink control information DCI. In the foregoing possible implementation, a network device indicates consistency of adjacent SIB messages by using the DCI. In this way, the terminal device can combine same SIB messages based on indication information, to restore coverage of receiving a signal SIB message by a narrowband terminal, and improve communication efficiency.

According to a sixth aspect, an information indication method is provided, applied to a network device. The method includes: determining third information; and the network device sends the third information, where the third information indicates whether a currently received SIB message is consistent with a previously sent SIB message, or the third information indicates whether a currently received SIB message is consistent with a next to-be-sent SIB message.

In a possible design, the third information may be carried in downlink control information DCI.

According to a seventh aspect, an information indication apparatus is provided. The apparatus includes: a receiving module, configured to receive a first message, where the first message includes first information, and the first information indicates location information of a first SSB; and a processing module, configured to determine the first SSB based on the first information.

In a possible design, the location information of the first SSB includes time-frequency resource allocation information or frequency information of at least one SSB.

In a possible design, the time-frequency resource allocation information includes a time domain and/or frequency domain offset between the first SSB and a second SSB, and the second SSB is an SSB corresponding to the first message.

In a possible design, the frequency information includes at least one global synchronization channel number GSCN offset, the at least one GSCN offset is a difference between a first GSCN corresponding to the at least one first SSB and a second GSCN, the GSCN offset is used to determine the first GSCN corresponding to the first SSB, and the second GSCN is a GSCN corresponding to the first message.

In a possible design, the frequency information includes at least one global synchronization channel number GSCN offset, and the at least one GSCN offset is used to determine, based on a second GSCN, a GSCN range corresponding to the at least one first SSB, or the at least one GSCN offset is used to determine, based on a second GSCN, that a GSCN range corresponding to the first SSB is not included, and the second GSCN is a GSCN corresponding to the first message.

In a possible design, the first message is a system information block SIB.

According to an eighth aspect, an information indication apparatus is provided. The apparatus includes: a receiving module, configured to receive a second message, where the second message includes second information, and the second information indicates a bandwidth range of an initial bandwidth part BWP; and a processing module, configured to perform initial access based on the second message.

In a possible design, the second information indicates a bandwidth range of an initial BWP corresponding to the second message, or a bandwidth range of an initial BWP corresponding to an SSB indicated in the second message.

In a possible design, the second information indicates that a bandwidth of the initial BWP is greater than or equal to a first threshold, and/or that the bandwidth of the initial BWP is less than or equal to a second threshold.

In a possible design, the second information is carried on a physical broadcast channel PBCH or a master information block MIB on the PBCH.

According to a ninth aspect, an information indication apparatus is provided. The apparatus includes: a processing module, configured to determine first information based on a first SSB, where the first information indicates location information of the first SSB; and a sending module, configured to send a first message, where the first message includes the first information.

In a possible design, the location information of the first SSB includes time-frequency resource allocation information or frequency information of at least one SSB.

In a possible design, the time-frequency resource allocation information includes a time domain and/or frequency domain offset between the first SSB and a second SSB, and the second SSB is an SSB corresponding to the first message.

In a possible design, the frequency information includes at least one first global synchronization channel number GSCN offset, the at least one GSCN offset is a difference between a GSCN corresponding to the at least one first SSB and a second GSCN, the GSCN offset is used to determine a GSCN corresponding to the first SSB, and the second GSCN is a GSCN corresponding to the first message.

In a possible design, the frequency information includes at least one global synchronization channel number GSCN offset, and the at least one GSCN offset is used to determine, based on a second GSCN, a GSCN range corresponding to the at least one first SSB, or the at least one GSCN offset is used to determine, based on a second GSCN, that a GSCN range corresponding to the first SSB is not included, and the second GSCN is a GSCN corresponding to the first message.

In a possible design, the first message is a system information block SIB.

According to a tenth aspect, an information indication apparatus is provided. The apparatus includes: a processing module, configured to determine second information, where the second information indicates a bandwidth range of an initial bandwidth part BWP; and a sending module, configured to send a second message, where the second message includes the second information.

In a possible design, the second information indicates a bandwidth range of an initial BWP corresponding to the second message, or a bandwidth range of an initial BWP corresponding to an SSB indicated in the second message.

In a possible design, the second information indicates that a bandwidth of the initial BWP is greater than or equal to a first threshold, and/or that the bandwidth of the initial BWP is less than or equal to a second threshold.

In a possible design, the second information is carried on a physical broadcast channel PBCH or a master information block MIB on the PBCH.

According to an eleventh aspect, an electronic device is provided. The electronic device includes a processor and a transmission interface. The processor is configured to execute instructions stored in a memory, to implement the method according to any one of the first aspect, the second aspect, or the fifth aspect.

According to a twelfth aspect, an electronic device is provided. The electronic device includes a processor and a transmission interface. The processor is configured to execute instructions stored in a memory, to implement the method according to any one of the third aspect, the fourth aspect, or the sixth aspect.

According to a thirteenth aspect, a computer-readable storage medium is provided, where the computer-readable storage medium stores instructions, and when the instructions are executed by a computer or a processor, the computer or the processor is enabled to perform the method according to any one of the first aspect, the second aspect, or the fifth aspect.

According to a fourteenth aspect, a computer-readable storage medium is provided, where the computer-readable storage medium stores instructions, and when the instructions are executed by a computer or a processor, the computer or the processor is enabled to perform the method according to any one of the third aspect, the fourth aspect, or the sixth aspect.

According to a fifteenth aspect, a computer program product is provided. The computer program product may include program instructions. When the computer program product is run on a computer, the computer is enabled to perform the method according to any one of the first aspect, the second aspect, or the fifth aspect.

According to a sixteenth aspect, a computer program product is provided. The computer program product may include program instructions. When the computer program product is run on a computer, the computer is enabled to perform the method according to any one of the third aspect, the fourth aspect, or the sixth aspect.

According to a seventeenth aspect, a communication system is provided. The communication system includes the apparatus according to the seventh aspect and the apparatus according to the ninth aspect, or the communication system includes the apparatus according to the eighth aspect and the apparatus according to the tenth aspect.

It may be understood that any information indication apparatus, the electronic device, the computer-readable storage medium, and the computer program product may be configured to perform the corresponding method provided above. Therefore, for beneficial effects that can be achieved by the information indication apparatus, the electronic device, the computer-readable storage medium, and the computer program product, refer to beneficial effects in the corresponding method provided above. Details are not described herein again.

DESCRIPTION OF EMBODIMENTS

The terms "first" and "second" mentioned in the following are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more.

It should be noted that, in this application, the word such as "example" or "for example" are used to represent giving an example, an illustration, or a description. Any embodiment or design solution described as an "example" or "for example" in this application should not be explained as being more preferred or having more advantages than another embodiment or design solution. Exactly, use of the word "example" or "for example" or the like is intended to present a relative concept in a specific manner.

The following clearly and completely describes the technical solutions in embodiments of this application with reference to the accompanying drawings in embodiments of this application. It is clear that the described embodiments are merely some but not all of embodiments of this application. All other embodiments obtained by a person of ordinary skill in the art based on embodiments of this application without creative efforts shall fall within the protection scope of this application.

First, an implementation environment and an application scenario of the embodiments of this application are briefly described with reference to the accompanying drawings.

Figure 1:
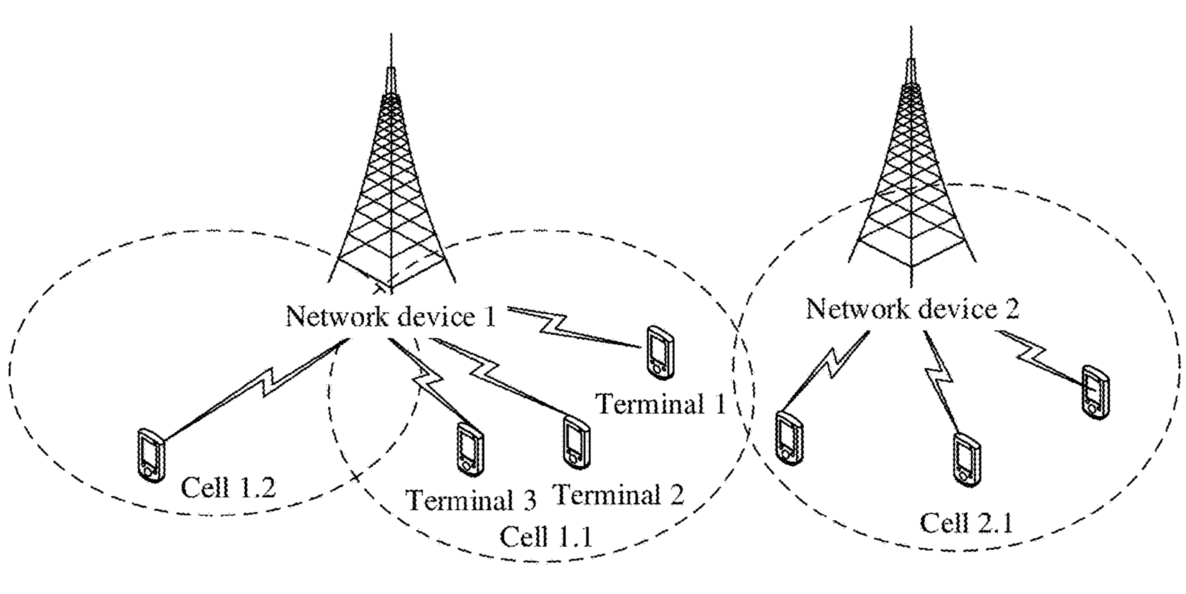
FIG. 1 is a diagram of an architecture of a communication system according to an embodiment of this application.

Embodiments of this application may be applied to a communication system shown in FIG. 1. The communication system may include a network device and a plurality of terminal devices. The network device may include an access network device, a core network device, a device (such as a server) of a service provider, and the like. This is not limited. The network device in embodiments of this application may cover one or more cells. For example, a network device 1 covers a cell 1.1 and a cell 1.2, and a network device 2 covers a cell 2.1. The terminal device may access a network device in one of the cells, and send uplink data to the network device and/or receive downlink data sent by the network device.

The cell may be an area for providing a wireless communication service for the terminal device, and the network device may provide the wireless communication service for the terminal device in the area. One network device may manage one or more cells. Each cell corresponds to a cell identifier, and the cell identifier uniquely identifies the cell. If the terminal device camps on a cell and is to access the camped cell, the cell may be referred to as a camping cell or a serving cell (serving cell) of the terminal device, and a cell around the serving cell and a cell adjacent to the serving cell may be referred to as a neighboring cell or an adjacent cell of the serving cell.

It should be noted that FIG. 1 is merely an example framework diagram, and a quantity of nodes and a quantity of cells included in FIG. 1 are not limited. In addition to function nodes shown in FIG. 1, other nodes may be further included, for example, a core network device, a gateway device, or an application server. This is not limited. The access network device communicates with the core network device by using a wired network or a wireless network. For example, the access network device and the core network device communicate with each other by using a next generation (Next Generation, NG) interface.

The network device is mainly configured to implement functions such as resource scheduling, radio resource management, and radio access control of the terminal device. Specifically, the network device may include any node in a base station, a wireless access point, a transceiver point (Transmission Receive Point, TRP), a transmission point (Transmission Point, TP), or another access node. In embodiments of this application, an apparatus configured to implement a function of the network device may be a network device, or may be an apparatus, for example, a chip system, that can support the network device to implement the function. The apparatus may be installed in the network device, or may be used together with the network device. The technical solution provided in embodiments of this application is described by using an example in which an apparatus configured to implement a function of a network device is a network device.

The terminal device may be user equipment (User Equipment, UE), a mobile station (Mobile Station, MS), a mobile terminal (Mobile Terminal, MT), or the like. Specifically, the terminal device may be a mobile phone, a tablet computer, or a computer with a wireless transceiver function, or may be a virtual reality (Virtual Reality, VR) terminal, an augmented reality (Augmented Reality, AR) terminal, a wireless terminal in industrial control, a wireless terminal in uncrewed driving, a wireless terminal in telemedicine, a wireless terminal in a smart grid, a wireless terminal in a smart city, a smart home, a vehicle-mounted terminal, a wearable terminal, or the like. The apparatus configured to implement a function of a terminal device may be a conventional terminal device or a narrowband terminal, or may be an apparatus that can support the terminal device to implement the function, for example, a chip system. The apparatus may be installed in the terminal device or used together with the terminal device. The following is described by using an example in which an apparatus configured to implement functions in this application is a terminal device.

Figure 2:
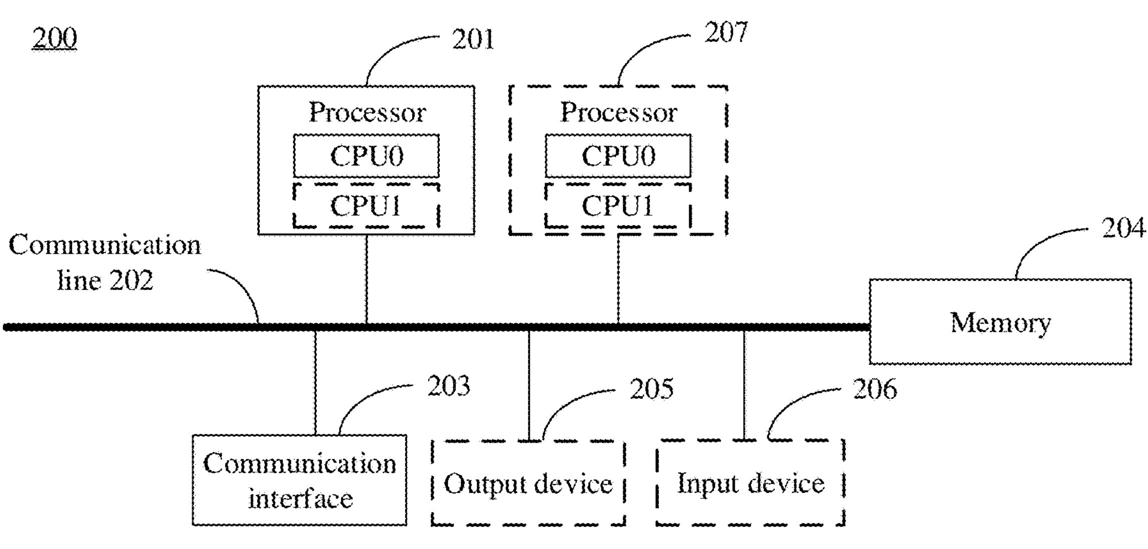
FIG. 2 is a diagram of a structure of a communication apparatus according to an embodiment of this application.

In a specific implementation, network elements shown in FIG. 1, for example, the terminal device and the network device, may use a composition structure shown in FIG. 2 or include components shown in FIG. 2. FIG. 2 is a schematic diagram of a structure of a communication apparatus 200 according to an embodiment of this application. When the communication apparatus 200 has functions of the terminal device in embodiments of this application, the communication apparatus 200 may be a terminal device, a chip in a terminal device, or a system on chip. When the communication apparatus 200 has the functions of the network device described in embodiments of this application, the communication apparatus 200 may be a network device, a chip in a network device, or a system on chip.

As shown in FIG. 2, the communication apparatus 200 may include a processor 201, a communication line 202, and a communication interface 203. Further, the communication apparatus 200 may further include a memory 204. The processor 201, the memory 204, and the communication interface 203 may be connected to each other through the communication line 202.

The processor 201 may be a central processing unit (Central Processing Unit, CPU), a general-purpose processor network processor (Network Processor, NP), a digital signal processor (Digital Signal Processing, DSP), a microprocessor, a microcontroller, a programmable logic device, or any combination thereof. The processor 201 may alternatively be another apparatus having a processing function, for example, a circuit, a component, or a software module.

The communication line 202 is configured to transmit information between components included in the communication apparatus 200.

The communication interface 203 is configured to communicate with another device or another communication network. The another communication network may be an Ethernet, a radio access network (Radio Access Network, RAN), a wireless local area network (Wireless Local Area Networks, WLAN), or the like. The communication interface 203 may be an interface circuit, a pin, a radio frequency module, a transceiver, or any apparatus that can implement communication.

The memory 204 is configured to store instructions. The instructions may be a computer program.

The memory 204 may be a read-only memory (Read-only Memory, ROM) or another type of static storage device that can store static information and/or instructions, may be a random access memory (Random Access Memory, RAM) or another type of dynamic storage device that can store information and/or instructions, or may be an electrically erasable programmable read-only memory (Electrically Erasable Programmable read-only Memory, EEPROM), a compact disc read-only memory (Compact Disc read-only Memory, CD-ROM) or another optical disc storage, an optical disc storage, a magnetic disk storage medium, or another magnetic storage device. The optical disc storage includes a compact optical disc, a laser disc, an optical disc, a digital versatile disc, a Blu-ray disc, or the like.

It should be noted that the memory 204 may exist independently of the processor 201, or may be integrated with the processor 201. The memory 204 may be configured to store instructions, program code, some data, or the like. The memory 204 may be located inside the communication apparatus 200, or may be located outside the communication apparatus 200. This is not limited. The processor 201 is configured to execute the instructions stored in the memory 204, to implement a method provided in the following embodiments of this application.

In an example, the processor 201 may include one or more CPUs, for example, a CPU 0 and a CPU 1 in FIG. 2.

In an optional implementation, the communication apparatus 200 includes a plurality of processors. For example, in addition to the processor 201 in FIG. 2, the communication apparatus 200 may further include a processor 207.

In an optional implementation, the communication apparatus 200 further includes an output device 205 and an input device 206. For example, the input device 206 is a device such as a keyboard, a mouse, a microphone, or a joystick, and the output device 205 is a device such as a display screen or a speaker.

It should be noted that the communication apparatus 200 may be a desktop computer, a portable computer, a network server, a mobile phone, a tablet computer, a wireless terminal, an embedded device, a chip system, or a device having a structure similar to a structure in FIG. 2. In addition, the composition structure shown in FIG. 2 does not constitute a limitation on the communication apparatus. In addition to the components shown in FIG. 2, the communication apparatus may include more or fewer components than components shown in the figure, combine some components, or have different component arrangements.

In this embodiment of this application, the chip system may include a chip, or may include a chip and another discrete component.

In FIG. 1, when the terminal device is powered on or needs to perform cell handover, the terminal device needs to perform an initial access process based on a synchronization signal periodically broadcast by the network device. An objective of initial access is mainly to obtain downlink synchronization with the network device and obtain system information of a cell. The system information may include a master information block (Master Information Block, MIB) and a system information block SIB. After the terminal device obtains the system information of the cell, the terminal device may determine whether the terminal device can camp on and/or access the cell, receive a paging message of the network device, and initiate a random access process to the network device, to establish a connection between the terminal device and the network device and transmit data.

Figure 3:
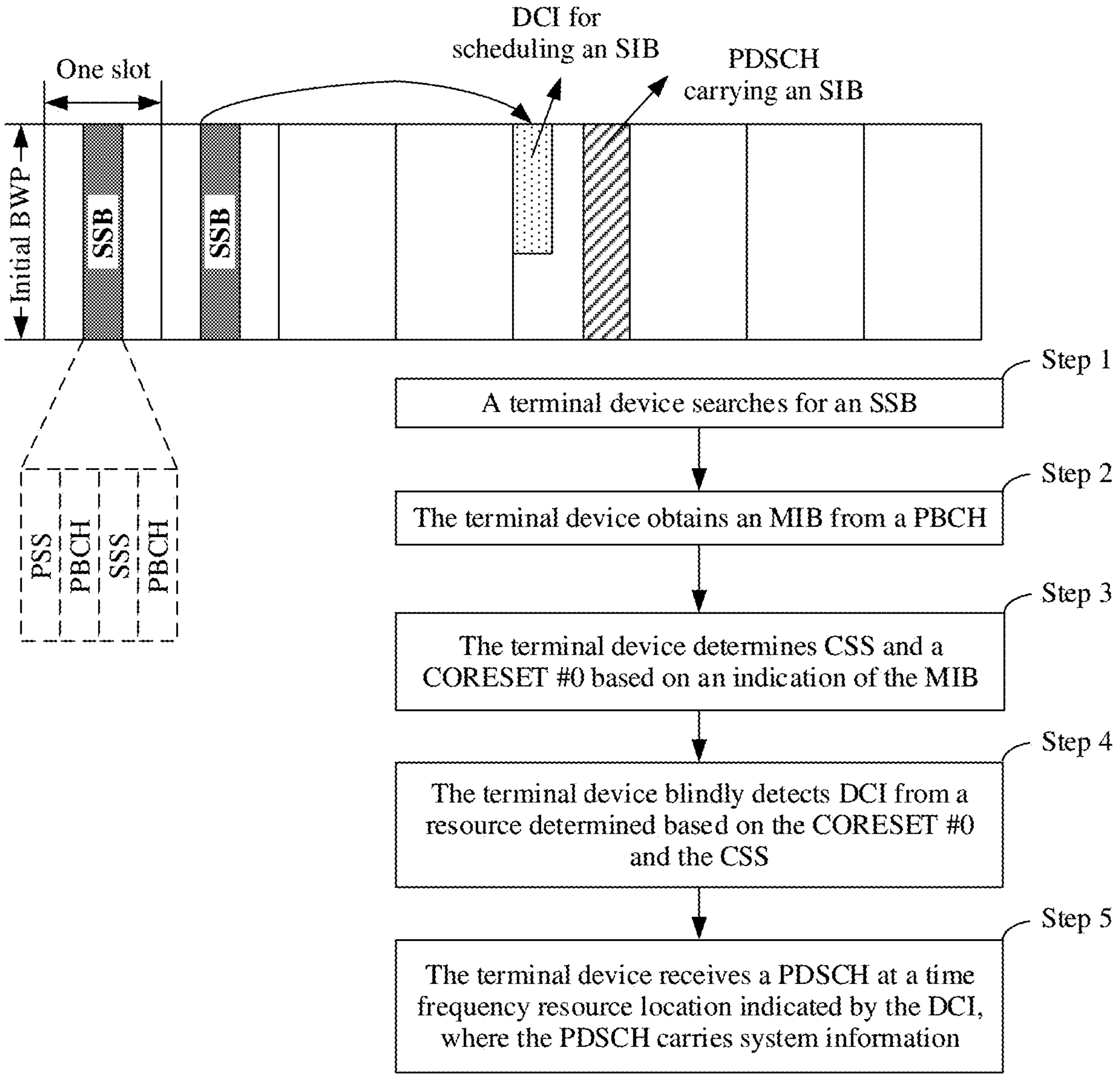
FIG. 3 is a schematic diagram of an initial access process performed by a terminal device according to an embodiment of this application.

A process in which the terminal device performs initial access may be shown in FIG. 3. The initial access process includes the following steps:

Step 1: A terminal device searches, on a frequency specified in a protocol, for a synchronization signal and physical broadcast channel block (synchronized signal and Physical Broadcast Channel block, SSB) broadcast by a network device in a cell. The SSB includes a primary synchronization signal (Primary Synchronization Signal, PSS), a secondary synchronization signal (Secondary Synchronization Signal, SSS), and a physical broadcast channel (Physical Broadcast Channel, PBCH).

It should be noted that a conventional NR protocol defines a global synchronization raster in all frequency ranges, and divides a licensed spectrum into two frequency ranges (Frequency Range, FR): a licensed spectrum FR 1 and a licensed spectrum FR 2. A frequency range of the FR 1 is 450 MHz to 6 GHz, and a frequency range of the FR 2 is 24 GHz to 52 GHz. The NR protocol specifies a frequency domain synchronization raster of each SSB frequency band, that is, determines frequencies that may appear in an SSB center frequency. Each frequency corresponds to a global synchronization channel number (Global Synchronization Channel Number, GSCN).

Step 2: The terminal device may obtain an MIB from a PBCH.

After the terminal device obtains the SSB through scanning, the terminal device may obtain an MIB message and an additional payload (payload) on the PBCH by decoding the PBCH. The PBCH includes 23 bits for carrying the MIB message, and the additional payload on the PBCH includes 8 bits: $\bar{a}_A$, $\bar{a}_{A+1}$, $\bar{a}_{A+2}$, . . . , and $\bar{a}_{A+7}$. The following separately describes the MIB message and information indicated by the additional payload on the PBCH with reference to Table 1.

TABLE 1

Content of an MIB message defined in a protocol

| Parameter name | Quantity of bits | Definition |
|---|---|---|
| systemFrameNumber | 6 | System frame number |
| subCarrierSpacingCommon | 1 | Subcarrier spacing |
| ssb-SubcarrierOffset | 4 | Indicate a subcarrier offset $k_{SSB}$ of an SSB |
| dmrs-TypeA-Position | 1 | Indicate a location of a demodulation reference signal DMRS |
| pdcch-ConfigSIB1 | 8 | Determine a common CORESET, common search space CSS, and necessary PDCCH parameters |
| cellBarred | 1 | Indicate whether a cell is barred |
| intraFreqReselection | 1 | Control cell selection/reselection on intra-frequency cells when a highest-priority cell is barred or barred by UE |
| Spare | 1 | Reserved bit |

The "ssb-SubcarrierOffset" field in the MIB message indicates a subcarrier offset $k_{SSB}$ of an SSB, and $k_{SSB}$ is a frequency domain offset between the SSB and an entire resource block grid. Alternatively, a value range of a $k_{SSB}$ field may be expanded by using the additional payload on the PBCH.

(1) For the licensed spectrum FR 1: $k_{SSB}$= $\bar{a}_{A+5}$|ssb-SubcarrierOffset.

To be specific, it indicates that a bit $\bar{a}_{A+5}$ in the additional payload on the PBCH is used jointly with the "ssb-SubcarrierOffset" field to represent $k_{SSB}$. Specifically, a most significant bit of $k_{SSB}$ is $\bar{a}_{A+5}$, and following bits are four bits included in the "ssb-SubcarrierOffset" field. A total of five bits indicate a value of $k_{SSB}$. Therefore, a value range of $k_{SSB}$ is 0 to 31.

(2) For the licensed spectrum FR 2: $k_{SSB}$=ssb-SubcarrierOffset.

To be specific, a value of $k_{SSB}$ is indicated by using four bits included in the "ssb-SubcarrierOffset" field. Therefore, a value range of $k_{SSB}$ is 0 to 15.

It should be noted that, for the FR 1, when $0 \le k_{SSB} \le 23$, it indicates that a current SSB has a CORESET #0 configuration. Alternatively, for the FR 2, when $0 \le k_{SSB} \le 21$, it indicates that a current SSB has a CORESET #0 configuration. For details, refer to the following content.

In addition, eight bits of the additional payload on the PBCH include $\bar{a}_A$, $\bar{a}_{A+1}$, $\bar{a}_{A+2}$, . . . , and $\bar{a}_{A+7}$, where $\bar{a}_A$, $\bar{a}_{A+1}$, $\bar{a}_{A+2}$, and $\bar{a}_{A+3}$ are four lower bits of a system frame number, and the four lower bits and the "systemFrameNumber" field (six bits) in the MIB message form a total of 10 bits, to indicate the system frame number. The bit $\bar{a}_{A+4}$ is used as a half-frame indication to indicate whether an SSB burst is located in a first half-frame or a second half-frame of one frame.

It should be noted that, time domain locations of the SSBs vary with different subcarrier spacings of SSBs. It is stipulated in the protocol that a plurality of SSBs form one SSB burst, and a period of one SSB burst is 5 ms. In a specific implementation, the network device may send an SSB in a spatial beam sweeping manner, and the network device needs to complete sweeping of one SSB burst within 5 ms. Each SSB in the SSB burst is sent by using one beam, and beams of different SSBs are different. Therefore, all directions in a cell can be scanned, and terminal devices at different locations in the cell can receive SSBs.

(1) For the licensed spectrum FR 1: Corresponding SSB subcarrier spacings are different, and a quantity of SSBs sent in one burst period may be 4 or 8. It can be learned from the foregoing description of indication of $k_{SSB}$ that the bit $\bar{a}_{A+5}$ is a most significant bit of $k_{SSB}$, $\bar{a}_{A+6}$ and $\bar{a}_{A+7}$ are reserved bits, and $\bar{a}_{A+6}$ and $\bar{a}_{A+7}$ may be used as indications of other information.

(2) For the licensed spectrum FR 2: A quantity of SSBs sent in one corresponding burst period may be 64. Therefore, the protocol specifies that $\bar{a}_{A+5}$, $\bar{a}_{A+6}$ and $\bar{a}_{A+7}$ indicate some information in SSB index information, and three bits are used as three higher bits of the SSB index information.

Step 3: The terminal device determines common search space (Common Search Space, CSS) and a control resource set (Control Resource Set, CORESET) #0 based on an indication of the MIB.

First, the terminal device may determine, based on $k_{SSB}$ indicated in the MIB message, whether the CORESET #0 is configured for a current SSB.

Specifically, for the FR 1, when $0 \le k_{SSB} \le 23$; or for the FR 2, when $0 \le k_{SSB} \le 21$, it indicates that the current SSB has the CORESET #0 configuration. To be specific, the current SSB is an SSB (cell defining-SSB, CD-SSB) defined for a cell; if the current SSB does not have the CORESET #0 configuration, the current SSB is a non-CD-SSB.

Further, when the terminal device determines, based on $k_{SSB}$, that the current SSB is the non-CD-SSB, the terminal device may further determine, based on the "pdcch-ConfigSIB1" field in the MIB message and $k_{SSB}$, a frequency location of an SSB for which the SIB 1 or the CORESET #0 may be configured, or further determine, based on the "pdcch-ConfigSIB1" field and $k_{SSB}$, a frequency location of an SSB for which the SIB 1 or the CORESET #0 may not be configured. For specific content of the protocol, refer to Table 2.

TABLE 2

| Determine based on pdcch-ConfigSIB1 and $k_{SSB}$ and switch indication | | |
|---|---|---|
| Range of $k_{SSB}$ | SIB 1 or CORESET #0 | Follow-up information |
| FR 1: $k_{SSB} \le 23$<br>FR 2: $k_{SSB} \le 11$ | Exist | If it is a CD-SSB, continue to decode an SIB 1 |
| FR 1: $24 \le k_{SSB} \le 29$<br>FR 2: $12 \le k_{SSB} \le 13$ | Does not exist | An SSB configured with a CORESET #0 exists in a GSCN range of $N_{GSCN}^{Reference} + N_{GSCN}^{offset}$ |
| FR 1: $k_{SSB} = 30$<br>FR 2: $k_{SSB} = 14$ | Does not exist | Reserved |
| FR 1: $k_{SSB} = 31$<br>FR 2: $k_{SSB} = 15$ | Does not exist | An SSB configured with a CORESET #0 does not exist in a GSCN range of $[N_{GSCN}^{Reference} - N_{GSCN}^{Start}, N_{GSCN}^{Reference} + N_{GSCN}^{End}]$ |

$$N_{GSCN}^{Reference}$$

is a GSCN of a current SSB, $$N_{GSCN}^{offset}$$

may be obtained through table lookup based on content indicated by the "pdcch-ConfigSIB1" field, and $$N_{GSCN}^{offset}$$

is an offset of a GSCN corresponding to an SSB for which the SIB 1 or the CORESET #0 is configured relative to a GSCN of the current SSB.

$$N_{GSCN}^{start}$$

and $$N_{GSCN}^{end}$$

may be respectively indicated by a higher bit and a lower bit of the "pdcch-ConfigSIB1" field.

Step 4: The terminal device blindly detects downlink control information (Downlink Control Information, DCI) from a resource determined based on the CORESET #0 and the CSS, where the DCI is used to schedule an SIB, and the DCI may be scrambled by using a system information-radio network temporary identifier (System Information-Radio Network Temporary Indicator, SI-RNTI).

Step 5: The terminal device receives a physical downlink shared channel (Physical Downlink Shared Channel, PDSCH) at a time-frequency resource location indicated by the DCI, where the PDSCH carries system information.

The terminal device may obtain the system information based on an indication of the DCI, for example, the SIB 1. The terminal device may obtain configuration information of an initial BWP, configuration information of a random access resource, and the like from the SIB 1. If the configuration information of the initial BWP is not configured in the SIB 1, the initial BWP is the CORESET #0 by default. The terminal device needs to perform an initial random access process on a time-frequency resource indicated by the initial BWP.

For example, a maximum bandwidth supported by REDCAP UE is 10 M. In the foregoing initial access process, if a bandwidth of an initial BWP of an SSB of the cell obtained by decoding the SIB 1 is 5 M, the REDCAP UE determines that a bandwidth condition is met and may attempt initial random access. If the REDCAP UE obtains, by decoding the SIB 1, that the bandwidth of the initial BWP of the SSB of the cell is 15 M, the REDCAP UE determines that the bandwidth condition is not met, and denotes both of the cell and an intra-frequency cell of the cell as barred. The REDCAP UE continues to search until a cell that meets a camping condition is found.

Based on the foregoing initial access process of the terminal device, this application is used to resolve a problem that an initial access process of a narrowband terminal is slow. Specifically, in embodiments of this application, specific indication information is configured to reduce a quantity of times that the narrowband terminal blindly scans SSBs, to accelerate an initial access process of the narrowband terminal. In an implementation, in step 5 in the foregoing initial access process, first information is configured to indicate a time-frequency resource configuration information of a narrowband bandwidth resource required by the narrowband terminal to access a network, to accelerate the initial access process of the narrowband terminal. In another implementation, in step 2 in the foregoing initial access process, second information is configured to indicate a bandwidth range of an initial bandwidth part BWP, to accelerate the initial access process of the narrowband terminal.

The following separately describes implementations provided in embodiments of this application with reference to the communication system shown in FIG. 1. Each device in the following embodiments may have components shown in FIG. 2. Actions, terms, and the like in embodiments of this application may be mutually referenced. This is not limited. In embodiments of this application, names of messages exchanged between devices, names of parameters in the messages, or the like are merely examples. Another name may alternatively be used in a specific implementation. This is not limited.

Figures 4, 5, 6:
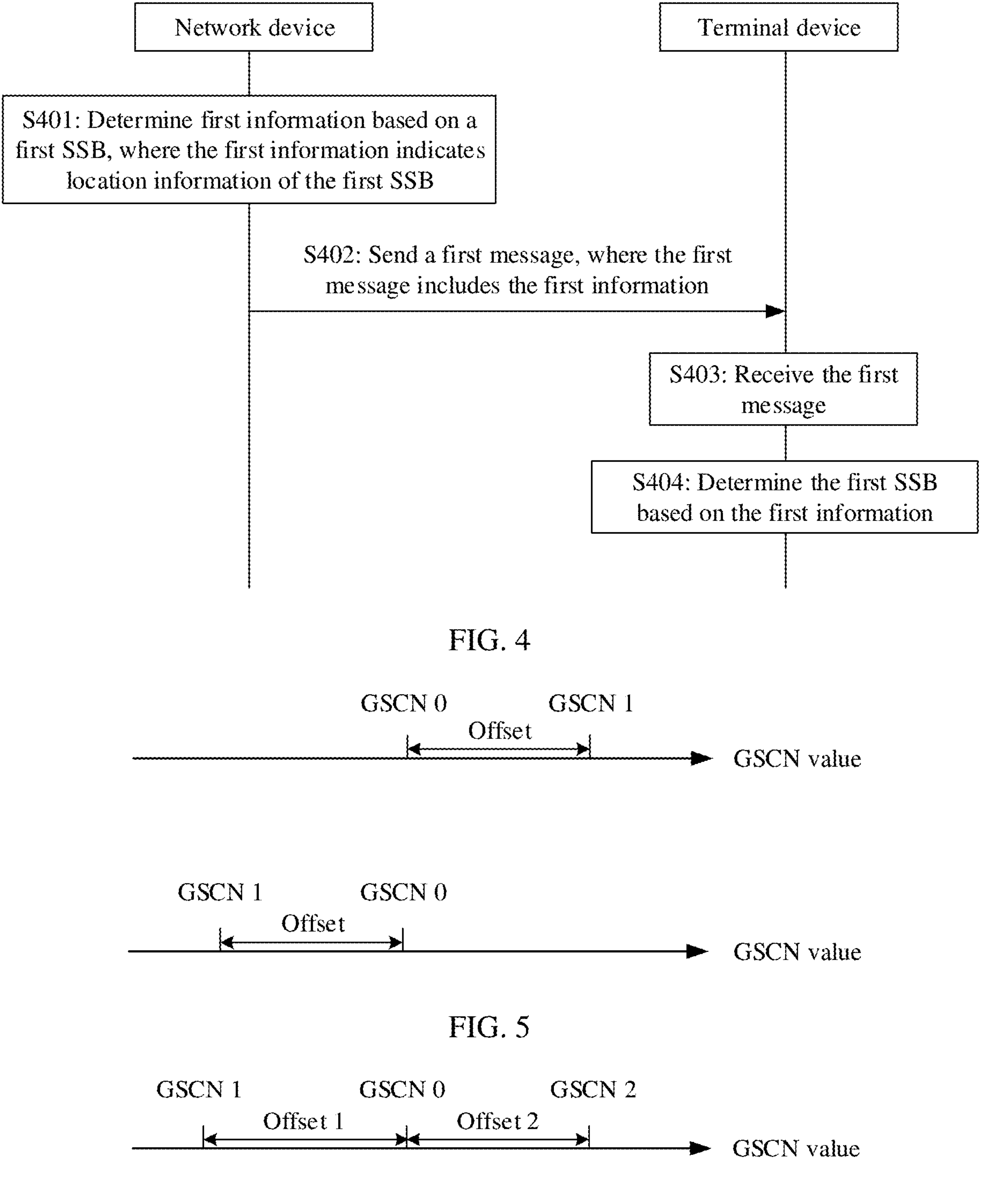
FIG. 4 is a schematic flowchart of an information indication method according to an embodiment of this application.
FIG. 5 is a schematic diagram of indication of first information in an information indication method according to an embodiment of this application.
FIG. 6 is another schematic diagram of indication of second information in an information indication method according to an embodiment of this application.

An embodiment of this application provides an information indication method, applied to the communication system shown in FIG. 1. As shown in FIG. 4, the method may include the following steps:

S401: A network device determines first information based on a first SSB, where the first information indicates location information of the first SSB.

The first SSB is a time-frequency resource required by a narrowband terminal to establish a connection. The narrowband terminal is a terminal device with low complexity and a narrow supported maximum bandwidth, for example, the foregoing REDCAP UE. Specifically, the narrowband terminal may include an industrial wireless sensor device, a video surveillance device, a wearable device, and the like. Alternatively, the narrowband terminal may refer to a conventional terminal device in a bandwidth-limited state in a certain case, for example, a mobile phone in a service or bandwidth-limited state. For example, a maximum bandwidth supported by the narrowband terminal may be 5 M, 10 M, or 20 M.

It can be learned from the foregoing that, when the terminal device accesses a network, the terminal device needs to decode the SIB 1, and determines whether a bandwidth of an initial BWP configured in the SIB 1 meets a maximum bandwidth condition supported by the terminal device, that is, the bandwidth of the initial BWP is less than the maximum bandwidth supported by the terminal device. If the terminal device determines that the condition is met, and the maximum bandwidth supported by the terminal device is less than or equal to a carrier bandwidth, it is considered that a camping bandwidth condition of the terminal device is met, and initial access may be attempted. Otherwise, the terminal device switches to a next SSB, and continues to attempt initial access. Therefore, a time-frequency resource required by the narrowband terminal to establish a connection may be referred to as a time-frequency resource for which a narrow initial BWP bandwidth is configured.

S402: The network device sends a first message, where the first message includes the first information.

In an implementation, the first message may be a system information block SIB, and the SIB indicates the first information.

S403: The terminal device receives the first message.

The terminal device receives the first message sent by the network device. The first message includes the first information indicating the location information of the first SSB. The first SSB is a time-frequency resource required for establishing a connection between the narrowband terminal and the network device. In other words, the first SSB may be an SSB for which a narrow initial BWP bandwidth is configured.

S404: The terminal device determines the first SSB based on the first information.

The terminal device obtains the first information based on the received first message, and determines the first SSB based on the location information that is of the first SSB and that is indicated in the first information.

In this application, the first information that is in the first message and that indicates the location information of the first SSB may indicate location information of a time-frequency resource for which a narrowband BWP is configured, or may indicate location information of a time-frequency resource for which no narrowband BWP is configured. Therefore, the terminal device may determine, by receiving the first information from the network device, information about a time-frequency resource of a narrowband BWP that is suitable for the narrowband terminal to establish a network connection, and the terminal device may switch to the time-frequency resource to attempt initial access. Alternatively, based on location information of a time-frequency resource for which no narrowband BWP is configured and that is indicated by the first information, the terminal device may skip the time-frequency resource indicated by the first information, and switch to another time-frequency resource to attempt initial access. Therefore, an initial access success rate can be improved, and an initial access process of the terminal can be accelerated.

In the foregoing implementation, in a process of performing initial access, the terminal device, especially the narrowband terminal, may obtain, based on the first information configured in the first message, location information about a time-frequency of the first SSB indicated by the first information, to directionally perform a subsequent initial access process based on the time-frequency resource. Therefore, a quantity of times that the narrowband terminal blindly scans time-frequency resources can be reduced, an initial access process of the narrowband terminal can be accelerated, and power consumption can be reduced.

In a possible implementation, the first message in step S01 may be a system information block SIB. To be specific, the terminal device may obtain the SIB, for example, the SIB 1, in step 5 by performing the foregoing initial access process. In this application, the first information is configured in the SIB 1 sent by the network device, to indicate location information of a time-frequency resource of the narrowband BWP. Specifically, a plurality of bits may be added to the SIB 1 to carry the first information. Specifically, a quantity of added bits may be preset based on content of the first information. This is not limited in this application. The following separately describes several different types of configuration content of the first information.

In a possible implementation, the first information in step S401 may further indicate time-frequency resource allocation information of at least one CORESET.

For example, the first information may be configured in the SIB 1 received by the terminal device, the first information indicates time-frequency resource allocation information of another CORESET #0, and a narrowband initial BWP is configured in an SIB 1 corresponding to the CORESET #0. Specifically, the time-frequency resource allocation information of the CORESET may be indicated by using a time-frequency resource offset, and the first information may include an offset of the CORESET in frequency domain and/or an offset of the CORESET in time domain.

For example, the offset of the CORESET in the frequency domain may be an offset between a first resource block (Resource Block, RB) of a CORESET #0 corresponding to a current SIB 1 and a first RB of the CORESET #0 indicated by the first information, or an offset between a last resource block RB of the CORESET #0 corresponding to the current SIB 1 and the first RB of the CORESET #0 indicated by the first information. The RB represents a time-frequency resource including 14 symbols in time domain and 12 subcarriers in frequency domain.

Further, the offset of the CORESET in the time domain may be an offset between a slot or a symbol in which the CORESET #0 corresponding to the current SIB 1 is located and a slot or a symbol in which the CORESET indicated by the first information is located.

In another possible implementation, the first information may indicate time-frequency resource allocation information of the first SSB. If a second SSB is a time-frequency resource corresponding to the first message, that is, a current SSB, the time-frequency resource allocation information of the first SSB may include a time domain and/or frequency domain offset between the first SSB and the second SSB. For example, the first information may be a time domain and/or frequency domain offset of the first SSB relative to a second SSB corresponding to a current first message.

Alternatively, in another possible implementation, the first information may further indicate frequency information corresponding to the first SSB. For example, the first information may be a frequency offset of the first SSB relative to the second SSB corresponding to the current first message, or the first information may be a frequency range of an SSB for which a narrowband BWP may be configured, or a frequency range of an SSB for which only a non-narrowband BWP is configured (that is, a frequency range of an SSB for which no narrowband BWP is configured). The following separately describes the two possible configuration manners of the first information. In a first manner, the first information may include a frequency offset of the first SSB relative to a frequency corresponding to a current first message.

Frequency information of an SSB may be represented by a corresponding global synchronization channel number GSCN. For example, a global synchronization channel number corresponding to the first SSB is a first GSCN, and a global synchronization channel number corresponding to the first message is a second GSCN. In other words, a current SSB is corresponding to the second GSCN. In this case, the first information may include at least one GSCN offset, and the at least one GSCN offset is a difference between the first GSCN and a second GSCN corresponding to at least one first SSB. Specifically, the at least one GSCN offset may be a difference obtained by subtracting the second GSCN from the first GSCN, or may be a difference obtained by subtracting the first GSCN from the second GSCN, and the at least one GSCN offset may be preset based on a requirement. This is not limited in this application.

The GSCN offset is used to determine the first GSCN corresponding to the first SSB. The terminal device may obtain, based on the GSCN offset and the second GSCN corresponding to the current SSB, the first GSCN corresponding to the first SSB.

For example, as shown in FIG. 5, the first information may include an offset, a GSCN 0 is a global synchronization channel number corresponding to a frequency at which the current SSB is located, and the offset is an offset of a frequency GSCN 1 at which the first SSB is located relative to the frequency GSCN 0 at which the current SSB is located. A value of the offset may be a positive number, or may be a negative number. A most significant bit in the first information may indicate that the value of the offset is a positive number or a negative number. For example, the first information may include six bits. A first bit indicates a positive or negative offset, and last five bits indicate an offset of the frequency GSCN 1 on which the first SSB is located relative to the frequency GSCN 0 on which the current SSB is located.

Further, in a specific implementation, the first information may include indication information of at least one first SSB, that is, there may be one or more frequency offsets indicated by the first information. When the first information includes a plurality of frequency offsets: offset 1, offset 2, . . . , after the terminal device receives the first information, the terminal device may randomly select one of the plurality of frequency offsets, to obtain frequency information of a corresponding first SSB for switching.

In a second manner, the first information may include a frequency range in which a narrowband BWP may be configured, or a frequency range in which only a non-narrowband BWP is configured.

If the first information may include a frequency range corresponding to at least one SSB, the first information may include at least one GSCN offset, and the at least one GSCN offset is used to determine, based on a second GSCN, a GSCN range corresponding to the at least one first SSB; or the at least one GSCN offset is used to determine, based on a second GSCN, that a GSCN range corresponding to the first SSB is not included. The second GSCN is a global synchronization channel number of a frequency corresponding to the first message.

The terminal device may obtain, based on the at least one GSCN offset and the second GSCN corresponding to a current first message, the GSCN range corresponding to the first SSB. The GSCN range may be a frequency range in which a narrowband BWP is configured, or may be a frequency in which only a non-narrowband BWP is configured. This may be specifically preset according to a requirement. This is not limited in this application.

In a possible implementation, if the first information includes only one GSCN offset, for example, a global synchronization channel number of the SSB corresponding to the first message is GSCN 0, the frequency range indicated by the first information may be:

$$[GSCN\ 0-\text{offset}, GSCN\ 0+\text{offset}].$$

In another possible implementation, if the first information includes two GSCN offsets: offset 1 and offset 2, for example, as shown in FIG. 6, a global synchronization channel number of an SSB corresponding to the first message is GSCN 0, a frequency range [GSCN 1, GSCN 2] indicated by the first information may be specifically [GSCN 0–offset 1, GSCN 0+offset 1].

Alternatively, the frequency range [GSCN 1, GSCN 2] indicated by the first information may be: [GSCN 0–offset 1, GSCN 0–offset 2], [GSCN 0+offset 1, GSCN 0–offset 2], [GSCN 0+offset 1, GSCN 0+offset 2], or [GSCN 0–offset 2, GSCN 0+offset 1]. Specifically, the frequency range may be preconfigured based on a possible frequency range.

In the foregoing several possible implementations of this application, the first information is configured in the first message to indicate location information of a time-frequency resource for which a narrowband BWP is configured or not, for example, indicate a frequency offset of a corresponding SSB or a frequency range of the SSB. In this way, the terminal device can obtain possible time-frequency resource configuration information of the first SSB based on the first information, and switch to a time-frequency resource for which a narrowband BWP may be configured, to perform an initial access operation. Therefore, a quantity of times of blindly scanning by the terminal device is reduced, an initial access process of the terminal device is accelerated.

In addition, in the foregoing embodiment, the first information may indicate another SSB for which a narrowband initial BWP is configured (or not configured), or the first message may indicate that a narrowband initial BWP is additionally configured for REDCAP UE. Alternatively, the initial BWP configured in the first message is narrow, and is suitable for access of the REDCAP UE.

Therefore, for example, one bit may be added to the SIB 1. When indication information of the bit is 0, it may indicate that the SIB 1 indicates configuration information of a narrowband initial BWP suitable for the narrowband terminal. When the indication information of the bit is 1, it may indicate that the SIB 1 indicates resource configuration information of the SSB for which the initial BWP suitable for the narrowband terminal is configured (or not configured).

Figure 7:
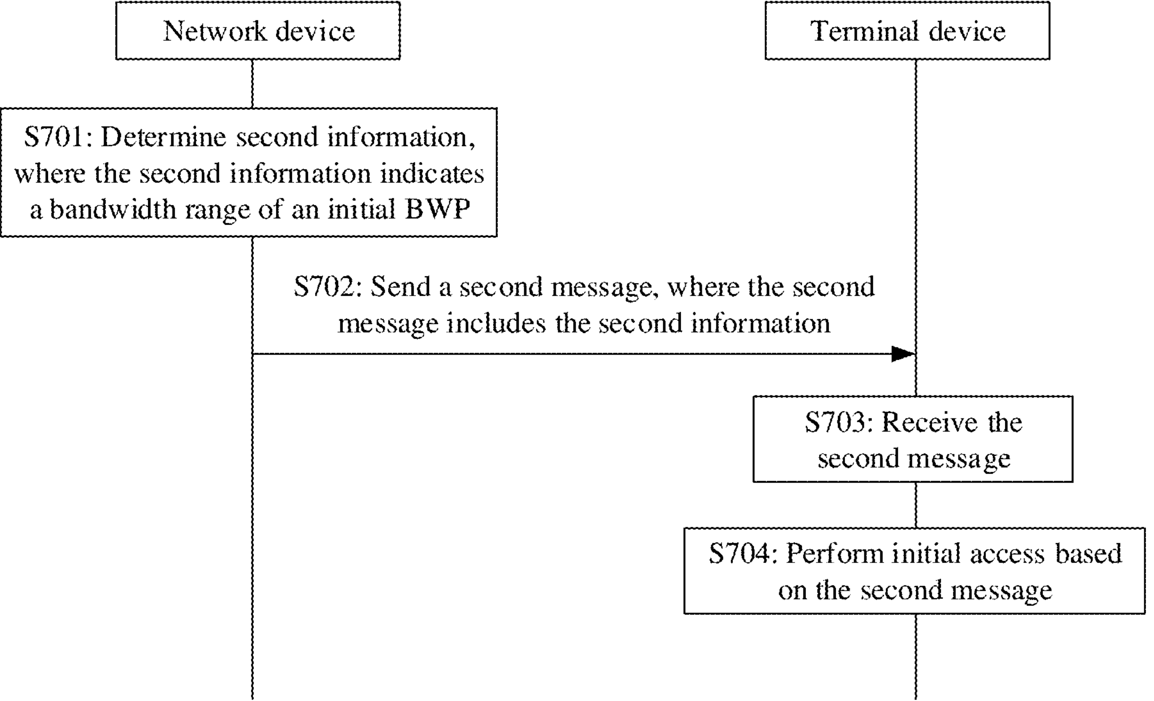
FIG. 7 is a schematic flowchart of another information indication method according to an embodiment of this application.

Different from the foregoing implementations, an embodiment of this application further provides another information indication method, applied to the communication system shown in FIG. 1. In the initial access process, second information is configured in a second message sent by a network device to a terminal device, to indicate a bandwidth range of an initial BWP of a current time-frequency resource or a bandwidth range of an initial BWP of a next to-be-scanned time-frequency resource. As shown in FIG. 7, the method includes the following steps.

S701: The network device determines the second information, where the second information indicates a bandwidth range of an initial BWP.

Possible bandwidth ranges of the initial BWP may be preset into several type, and preset bandwidth ranges of different initial BWPs are indicated by using at least one bit. In other words, the second information may indicate that a bandwidth of the initial BWP is greater than or equal to a first threshold, and/or that the bandwidth of the initial BWP is less than or equal to a second threshold.

For example, to reduce overheads of the second information, one bit may be used to indicate the second information. When one bit is used for indication, a value of the bit is a binary number. In this case, a maximum of two different bandwidth ranges of the initial BWP may be configured.

For example, different values of one bit may indicate whether a bandwidth of the initial BWP is greater than or equal to 10 M. In other words, different values of the bit may indicate two bandwidth ranges: a bandwidth range of the initial BWP is greater than or equal to 10 M and a bandwidth range of the initial BWP is less than 10 M. When the indication information of the bit is 0, it may indicate that the bandwidth of the initial BWP of the SSB indicated by the second information is greater than or equal to 10 M. When the indication information of the bit is 1, it may indicate that the bandwidth of the initial BWP of the SSB indicated by the second information is less than 10 M.

In a possible implementation, when the second information is indicated by using two bits, value of the bit is a binary number. In this case, a maximum of four types of bandwidth ranges of different initial BWPs may be configured, and the rest may be deduced by analogy. This is not specifically limited in this application.

S702: The network device sends a second message, where the second message includes the second information.

The second message may be carried on a PBCH, or the second message may be carried on a master information block MIB on the PBCH. For example, a reserved indicator bit in the MIB may indicate the second information, and two different bandwidth ranges of the initial BWPs may be configured. For example, if a value of the bit is 1, it indicates that the bandwidth of the initial BWP of the SSB indicated by the second information is less than 20 M. If a value of the bit is 0, it indicates that the bandwidth of the initial BWP of the SSB indicated by the second information is greater than or equal to 20 M.

S703: The terminal device receives the second message.

In an implementation, the second message may be carried on a physical broadcast channel PBCH. It can be learned from the foregoing description of the initial access process that, for the licensed spectrum FR 1, there are two reserved bits in an additional payload on the PBCH: $\bar{a}_{A+6}$ and $\bar{a}_{A+7}$. Therefore, the two reserved bits may indicate a bandwidth range of the initial BWP. In other words, the second information may indicate by using at least one reserved bit in the additional payload on the PBCH, for example, $\bar{a}_{A+6}$ and/or $\bar{a}_{A+7}$. For example, based on the foregoing manner in which one bit indicates, the second information may be indicated by using a bit $\bar{a}_{A+6}$ or a bit $\bar{a}_{A+7}$.

For example, the second information may be indicated by using bits $\bar{a}_{A+6}$ and $\bar{a}_{A+7}$. For example, a configuration is shown in the following Table 3. When indication information of bits $\bar{a}_{A+6}$ and $\bar{a}_{A+7}$ is 00, it indicates that a bandwidth range B1 of the initial BWP is 5 M≤B1<10 M. When the indication information of bits $\bar{a}_{A+6}$ and $\bar{a}_{A+7}$ is 01, it indicates that a bandwidth range B2 of the initial BWP is 10 M≤B2<20 M. When the indication information of bits $\bar{a}_{A+6}$ and $\bar{a}_{A+7}$ is 10, it indicates that a bandwidth range B3 of the initial BWP is B3≥20 M. When the indication information of bits $\bar{a}_{A+6}$ and $\bar{a}_{A+7}$ is 11, it indicates that corresponding indication information is a reserved indicator bit, and other indication information may be configured. This is not limited in this application.

TABLE 3

Bits $\bar{a}_{A+6}$ and $\bar{a}_{A+7}$ indicate second information

| $\bar{a}_{A+6}$, $\bar{a}_{A+7}$ | Bandwidth range of an initial BWP |
|---|---|
| 00 | 5M ≤ B1 < 10M |
| 01 | 10M ≤ B2 < 20M |
| 10 | B3 ≥ 20M |
| 11 | ≥Reserved |

It can be learned that the bandwidth of the initial BWP indicated by the second information may also be divided into more ranges. For example, B1 is (5 M to 10 M), B2 is (10 M to 15 M), B3 is (15 M to 20 M), and B4 is (less than 5 M). The bandwidth of the initial BWP may be set based on a configuration requirement and a bit that carries the second information. This is not specifically limited in this application.

S704: The terminal device performs initial access based on the second message.

The terminal device may continue to perform an initial access process on a current SSB based on an indication of the second information in the second message, or the terminal device may switch to a next SSB to perform initial access.

In an implementation, the second information indicates a bandwidth range of an initial BWP of a current SSB corresponding to the second message, or the second information indicates a bandwidth range of an initial BWP corresponding to another SSB. In other words, content indicated by the second information may indicate a bandwidth range of an initial BWP of an SSB on which initial access is currently performed, and specifically, the content whether a bandwidth range of a current initial BWP meets a narrowband bandwidth condition for access of the narrowband terminal. Alternatively, the content indicated by the second information may indicate a bandwidth range of an initial BWP of a next to-be-received SSB, and specifically, the content is whether a bandwidth range of an initial BWP of the next SSB meets a narrowband bandwidth condition for access of the narrowband terminal.

(1) The second information indicates a bandwidth range of an initial BWP of an SSB on which initial access is currently performed.

If the second information indicates the bandwidth range of the initial BWP of the current SSB, the terminal device may determine, based on an indication of the second information, whether to continue to read the SIB 1 or read another SSB through switching. When it is determined that the bandwidth range of the initial BWP of the current SSB does not meet the narrowband bandwidth condition for access of the narrowband terminal, the terminal device may switch to read a next SSB. In this way, a message reading process in a subsequent step can be reduced, and power waste can be effectively reduced.

(2) The second information indicates a bandwidth range of an initial BWP of a next to-be-received SSB.

For the FR 1, if 24≤$k_{SSB}$≤29, and the second information indicates a bandwidth range of an initial BWP of a next SSB for which the CORESET #0 is configured, the terminal device may determine, based on an indication of the second information, to switch to read the SSB indicated by the second information, or may ignore the SSB.

In conclusion, in the information indication manner provided in the foregoing embodiment of this application, the terminal device may determine, in advance based on the indication of the second information, whether to attempt an initial access process on an SSB indicating an initial BWP bandwidth range or skip the SSB to perform initial access. Therefore, in the initial access process, the terminal device may determine in advance whether the initial BWP bandwidth condition can meet a camping condition of the narrowband terminal. Therefore, an initial access process of the narrowband terminal is accelerated. In addition, this can further greatly accelerate an SSB frequency domain search process performed by the narrowband terminal, and reduce power consumption caused by an initial access attempt.

Further, based on the foregoing two implementations of this application, an embodiment of this application further provides another information indication method, to resolve the following problem in the foregoing implementations: In a process in which a network device periodically sends an SIB 1 to a terminal device, there is a loss in coverage of a signal received by a narrowband terminal because the narrowband terminal has reduced complexity, a reduced bandwidth, a reduced quantity of antennas, and the like. Therefore, the narrowband terminal may restore and enhance signal coverage by combining a plurality of same SIB is that are received.

The method may be applied to the communication system shown in FIG. 1, and may be specifically applied to the initial access process in the foregoing embodiment. The method may specifically include the following steps:

Step 1: A network device sends third information, where the third information indicates whether a currently received SIB message is consistent with a previously sent SIB message, or the third information indicates whether a currently received SIB message is consistent with a next to-be-sent SIB message.

The third information may be carried in downlink control information DCI, and is indicated by using at least one bit.

It can be learned from the foregoing initial access process that in step 5, the network device sends the physical downlink shared channel (Physical Downlink Shared Channel, PDSCH) at the time-frequency resource location indicated by the DCI, and the PDSCH carries system information such as the SIB 1. For example, the network device sends a same SIB 1 at a period of 160 ms. A default repetition sending period of the SIB 1 may be 20 ms. In other words, the network device may repeatedly send a same SIB 1 message for eight times within 160 ms. However, in an actual application, the repetition sending period depends on a specific situation of network communication. Therefore, when there is a loss in receiving the SIB 1 message by the narrowband terminal, the terminal device may implement coverage enhancement for receiving the SIB 1 information by repeatedly receiving and combining a plurality of same SIB 1 messages.

In an implementation, the DCI sent by the network device includes the third information, and the third information may indicate, by using one bit, whether a currently received SIB message corresponding to the third information is consistent with a previously sent SIB message. For example, if indication information of the third information is 0, it indicates that an SIB message corresponding to the third information is consistent with the previously sent SIB message. If the indication information of the third information is 1, it indicates that the SIB message corresponding to the third information is inconsistent with the previously sent SIB message.

In another implementation, the third information may further indicate whether a currently received SIB message corresponding to the third information is consistent with a next to-be-sent SIB message. For example, if indication information of the third information is 0, it indicates that an SIB message corresponding to the third information is consistent with the next to-be-sent SIB message. If the indication information of the third information is 1, it indicates that the SIB message corresponding to the third information is inconsistent with the next to-be-sent SIB message.

Step 2: The terminal device receives the third information.

Step 3: The terminal device combines a plurality of received SIB messages based on the third information.

The terminal device may determine, based on the third information, whether the currently received SIB message is consistent with the previously received SIB message, or the terminal device may determine, based on the third information, whether the currently received SIB message is consistent with the next to-be-received SIB message.

For example, when the third information indicates that the currently received SIB message is consistent with the previously received SIB message, the terminal device may continue to combine the currently received SIB message and the previously received SIB message. When the third information indicates that the currently received SIB message is inconsistent with the previously received SIB message, the terminal device stops combining the currently received SIB message and the previously received SIB message. When the third information indicates that the currently received SIB message is consistent with the next to-be-received SIB message, the terminal device may continue to combine the next to-be-received SIB message with the currently received SIB message, to restore signal coverage.

According to the foregoing implementation of this application, the terminal device may determine, based on the received third information, whether to continue to combine the currently received SIB message and a next SIB message. In this way, content of received same SIB messages are combined, to enhance coverage of the SIB messages and restore the SIB messages.

It may be understood that, to implement the foregoing functions, the terminal device or the network device includes corresponding hardware structures and/or software modules for performing the functions. A person skilled in the art should be easily aware that, in combination with the examples described in embodiments of this specification, units and algorithm operations may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, function modules of the terminal device or the network device may be divided based on the foregoing method examples. For example, each function module may be obtained through division based on each function, or two or more functions may be integrated into one processing module. The integrated module may be implemented in a form of hardware, or may be implemented in a form of a software functional module. It should be noted that, in embodiments of this application, division into modules is an example, and is merely a logical function division. In an actual implementation, another division manner may be used.

Figure 8:
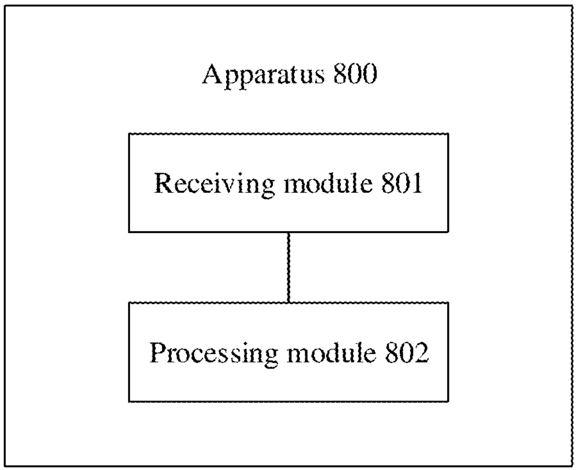
FIG. 8 is a schematic diagram of a structure of an information indication apparatus according to an embodiment of this application.

For example, when the function modules are obtained through division in an integrated manner, FIG. 8 is a schematic diagram of a structure of an information indication apparatus. The test apparatus may be a chip or a system on chip in a terminal device, or another combined component, another component, or the like that can implement a function of the foregoing terminal device. The apparatus may be configured to perform the function of the terminal device in the foregoing embodiments.

An embodiment of this application further provides an information indication apparatus, to implement an action performed by the foregoing terminal device in the embodiments. As shown in FIG. 8, the apparatus 800 may include a receiving module 801 and a processing module 802.

The receiving module 801 is configured to receive a first message, where the first message includes first information, and the first information indicates location information of a first SSB.

The processing module 802 is configured to determine the first SSB based on the first information.

In a possible design, the location information of the first SSB includes time-frequency resource allocation information or frequency information of at least one SSB.

In a possible design, the time-frequency resource allocation information includes a time domain and/or frequency domain offset between the first SSB and a second SSB, and the second SSB is an SSB corresponding to the first message.

In a possible design, the frequency information includes at least one global synchronization channel number GSCN offset, the at least one GSCN offset is a difference between a first GSCN corresponding to the at least one first SSB and a second GSCN, and the second GSCN is a GSCN corresponding to the first message.

In a possible design, the frequency information includes at least one global synchronization channel number GSCN offset, and the at least one GSCN offset is used to determine, based on a second GSCN, a GSCN range corresponding to the at least one first SSB, or the at least one GSCN offset is used to determine, based on a second GSCN, that a GSCN range corresponding to the first SSB is not included, and the second GSCN is a GSCN corresponding to the first message.

In a possible design, the first message is a system information block SIB.

In addition, an embodiment of this application further provides another information indication apparatus. As shown in FIG. 8, the apparatus 800 may include a receiving module 801 and a processing module 802.

The receiving module 801 is configured to receive a second message, where the second message includes second information, and the second information indicates a bandwidth range of an initial bandwidth part BWP.

The processing module 802 is configured to perform initial access based on the second message.

In a possible design, the second information indicates a bandwidth range of an initial BWP corresponding to the second message, or a bandwidth range of an initial BWP corresponding to an SSB indicated in the second message.

In a possible design, the second information indicates that a bandwidth of the initial BWP is greater than or equal to a first threshold, and/or that the bandwidth of the initial BWP is less than or equal to a second threshold.

In a possible design, the second message is carried on a physical broadcast channel PBCH or a master information block MIB on the PBCH.

Figure 9:
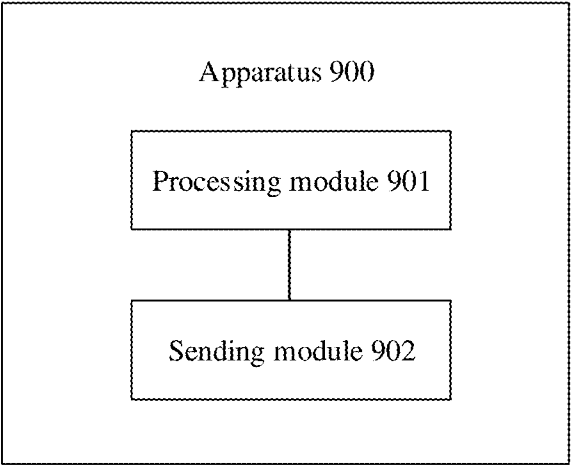
FIG. 9 is a schematic diagram of a structure of another information indication apparatus according to an embodiment of this application.

Further, corresponding to the apparatus 800 in FIG. 8, FIG. 9 is a schematic diagram of a structure of an information indication apparatus. The apparatus 900 may be a chip or a system on chip in a network device, or another combined component, another component, or the like that can implement a function of the foregoing network device. The apparatus may be configured to perform the function of the network device in the foregoing embodiments.

The apparatus 900 includes a processing module 901 and a sending module 902. The processing module 901 is configured to determine first information based on a first SSB, where the first information indicates location information of the first SSB. The sending module 902 is configured to send a first message, where the first message includes the first information.

In a possible design, the location information of the first SSB includes time-frequency resource allocation information or frequency information of at least one SSB.

In a possible design, the time-frequency resource allocation information includes a time domain and/or frequency domain offset between the first SSB and a second SSB, and the second SSB is an SSB corresponding to the first message.

In a possible design, the frequency information includes at least one first global synchronization channel number GSCN offset, the at least one GSCN offset is a difference between a GSCN corresponding to the at least one first SSB and a second GSCN, and the second GSCN is a GSCN corresponding to the first message.

In a possible design, the frequency information includes at least one global synchronization channel number GSCN offset, and the at least one GSCN offset is used to determine, based on a second GSCN, a GSCN range corresponding to the at least one first SSB, or the at least one GSCN offset is used to determine, based on a second GSCN, that a GSCN range corresponding to the first SSB is not included, and the second GSCN is a GSCN corresponding to the first message.

In a possible design, the first message is a system information block SIB.

In addition, this application further provides another information indication apparatus. The apparatus 900 includes a processing module 901 and a sending module 902. The processing module 901 is configured to determine second information, where the second information indicates a bandwidth range of an initial bandwidth part BWP. The sending module 902 is configured to send a second message, where the second message includes the second information.

In a possible design, the second information indicates a bandwidth range of an initial BWP corresponding to the second message, or a bandwidth range of an initial BWP corresponding to an SSB indicated in the second message.

In a possible design, the second information indicates that a bandwidth of the initial BWP is greater than or equal to a first threshold, and/or that the bandwidth of the initial BWP is less than or equal to a second threshold.

In a possible design, the second message is a physical broadcast channel PBCH or a master information block MIB on the PBCH.

It may be understood that when the apparatus is an electronic device, the sending module may be a transmitter, and may include an antenna, a radio frequency circuit, and the like, and the processing module may be a processor, for example, a baseband chip. When the apparatus is a component having a function of the foregoing terminal device or the network device, the sending module may be a radio frequency unit, and the processing module may be a processor. When the apparatus is a chip system, the sending module may be an output interface of the chip system, and the processing module may be a processor of the chip system, for example, a central processing unit (central processing unit, CPU).

It should be noted that for a specific execution process and embodiments of the foregoing apparatus 800, refer to the steps performed by the terminal device and related descriptions in the foregoing method embodiments. For a specific execution process and embodiments of the foregoing apparatus 900, refer to the steps performed by the network device and related descriptions in the foregoing method embodiments. For resolved technical problems and technical effects of the apparatus 800 and the apparatus 900, refer to the content in the foregoing embodiments. Details are not described herein again.

In this embodiment, the information indication apparatus is presented in a form of function modules obtained through division in an integrated manner. The "module" herein may be a specific circuit, a processor and a memory that execute one or more software or firmware programs, an integrated logic circuit, and/or another component that can provide the foregoing functions. In a simple embodiment, a person skilled in the art may figure out that the information indication apparatus may be in a form shown in FIG. 2.

For example, functions/implementation processes of the processing module in FIG. 8 or FIG. 9 may be implemented by the processor 201 in FIG. 2 by invoking the computer program instructions stored in the memory 204. For example, functions/implementation processes of the receiving module 801 in FIG. 8 may be implemented by using the communication interface in FIG. 2, and functions/implementation processes of the processing module 802 may be implemented by the processor 201 in FIG. 2 by invoking the computer-executable instructions stored in the memory 204. Functions/implementation processes of the processing module 901 in FIG. 9 may be implemented by the processor 201 in FIG. 2 by invoking the computer-executable instructions stored in the memory 204, and functions/implementation processes of the sending module 902 may be implemented by the processor 201 in FIG. 2 by invoking the communication interface 203.

An example embodiment further provides a computer-readable storage medium including instructions. The instructions may be executed by the processor 201 or 207 of the communication apparatus 200 to complete the information indication method in the foregoing embodiments. Therefore, for technical effects that can be achieved by the method, refer to the foregoing method embodiments. Details are not described herein again.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus.

After going through the specification and practicing the invention disclosed herein, a person skilled in the art can easily figure out other implementation solutions of this application. This application is intended to cover any variations, functions, or adaptive changes of this application. These variations, functions, or adaptive changes comply with general principles of this application, and include common knowledge or a commonly used technical means in the technical field that is not disclosed in this application.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method performed by a first user equipment (UE) or a chip in a first UE, the method comprising:

receiving a first message comprising first information;

determining frequency location information of a first synchronization signal and physical broadcast channel block (SSB) based on the first information; and in response to the first information indicating frequency location information of the first SSB which can be used by a reduced capability (REDCAP) UE to establish a connection with a network device, switching to a frequency indicated by the frequency location information;

wherein the first message is a system information block (SIB) and the first UE is a REDCAP UE.

2. The method according to claim 1, wherein the frequency location information comprises at least one global synchronization channel number (GSCN) offset, the at least one GSCN offset is a difference between a first GSCN corresponding to the first SSB and a second GSCN corresponding to the first message.

3. The method according to claim 1, wherein the frequency location information comprises at least one global synchronization channel number (GSCN) offset, and the at least one GSCN offset is used to determine a GSCN range corresponding to the first SSB.

4. The method according to claim 1, further comprising:

in response to the first information indicating frequency location information of the first SSB which cannot be used by the REDCAP UE to establish a connection with the network device, skipping a frequency indicated by the frequency location information.

5. An apparatus, comprising:

one or more processors; and one or more memories coupled to the one or more processors and storing instructions that, when executed by the one or more processors, cause the apparatus to:

receive a first message comprising first information;

determine frequency location information of a first synchronization signal and physical broadcast channel block (SSB) based on the first information; and in response to the first information indicating frequency location information of the first SSB which can be used by a reduced capability (REDCAP) UE to establish a connection with a network device, switch to a frequency indicated by the frequency location information;

wherein the first message is a system information block (SIB) and the apparatus is a REDCAP UE or the apparatus is a chip of a REDCAP UE.

6. The apparatus according to claim 5, wherein the frequency location information comprises at least one global synchronization channel number (GSCN) offset, the at least one GSCN offset is a difference between a first GSCN corresponding to the first SSB and a second GSCN corresponding to the first message.

7. The apparatus according to claim 5, wherein the frequency location information comprises at least one global synchronization channel number (GSCN) offset, and the at least one GSCN offset is used to determine a GSCN range corresponding to the first SSB.

8. The apparatus according to claim 5, wherein the apparatus is further caused to:

in response to the first information indicating the frequency location information of the first SSB which cannot be used by the REDCAP UE to establish a connection with the network device, skip a frequency indicated by the frequency location information.

9. A non-transitory computer readable storage medium storing computer program code that, when executed by a processor, cause an apparatus to:

receive a first message comprising first information;

determine frequency location information of a first synchronization signal and physical broadcast channel block (SSB) based on the first information; and in response to the first information indicating frequency location information of a first synchronization signal and physical broadcast channel block (SSB) which can be used by a reduced capability (REDCAP) UE to establish a connection with a network device, switch to a frequency indicated by the frequency location information;

wherein the first message is a system information block (SIB) and the first UE apparatus is a REDCAP UE or the apparatus is a chip of a REDCAP UE.

10. The non-transitory computer readable storage medium according to claim 9, wherein the frequency location information comprises at least one global synchronization channel number (GSCN) offset, the at least one GSCN offset is a difference between a first GSCN corresponding to the first SSB and a second GSCN corresponding to the first message.

11. The non-transitory computer readable storage medium according to claim 9, wherein the frequency location information comprises at least one global synchronization channel number (GSCN) offset, and the at least one GSCN offset is used to determine a GSCN range corresponding to the first SSB.

12. The non-transitory computer readable storage medium according to claim 9, wherein the apparatus is further caused to:

in response to that the first information indicating the frequency location information of the first SSB which cannot be used by the REDCAP UE to establish a connection with the network device, skip a frequency indicated by the frequency location information.

13. A computer program product comprising a computer program or instructions, wherein when the computer program or instructions are executed by a processor of an apparatus, the apparatus is caused to:

receive a first message comprising first information;

determine frequency location information of a first synchronization signal and physical broadcast channel block (SSB) based on the first information; and in response to the first information indicating frequency location information of the first SSB which can be used by a reduced capability (REDCAP) UE to establish a connection with a network device, switch to a frequency indicated by the frequency location information;

wherein the first message is a system information block (SIB) and the apparatus is a REDCAP UE.

14. The computer program product according to claim 13, wherein the apparatus is further caused to:

in response to that the first information indicating the frequency location information of the first SSB which cannot be used by the REDCAP UE to establish a connection with the network device, skip a frequency indicated by the frequency location information.

15. The computer program product according to claim 13, wherein the frequency location information comprises at least one global synchronization channel number (GSCN) offset, the at least one GSCN offset is a difference between a first GSCN corresponding to the first SSB and a second GSCN corresponding to the first message.

16. The computer program product according to claim 13, wherein the frequency location information comprises at least one global synchronization channel number (GSCN) offset, and the at least one GSCN offset is used to determine a GSCN range corresponding to the first SSB.

* * * * *